(12) United States Patent
de Rochemont (10) Patent No.: US 9,023,493 B2
(45) Date of Patent: May 5, 2015

(54) CHEMICALLY COMPLEX ABLATIVE MAX-PHASE MATERIAL AND METHOD OF MANUFACTURE

(76) Inventor: L. Pierre de Rochemont, Austin, TX (US)

( * ) Notice: Subject to any disclaimer, the term of this patent is extended or adjusted under 35 U.S.C. 154(b) by 731 days.

(21) Appl. No.: 13/182,405

(22) Filed: Jul. 13, 2011

(65) Prior Publication Data

US 2012/0012403 A1     Jan. 19, 2012

Related U.S. Application Data (60) Provisional application No. 61/363,813, filed on Jul. 13, 2010.

(51) Int. Cl.
| | | |
|---|---|---|
| *B32B 15/04* | (2006.01) | |
| *E21B 10/46* | (2006.01) | |
| *C23C 24/08* | (2006.01) | |
| *C23C 28/04* | (2006.01) | |

(52) U.S. Cl.
CPC .............. *E21B 10/46* (2013.01); *C23C 24/085* (2013.01); *C23C 28/044* (2013.01); *C23C 28/048* (2013.01)

(58) Field of Classification Search
USPC ................................. 428/698, 697
See application file for complete search history.

(56) References Cited

U.S. PATENT DOCUMENTS

| | | |
|---|---|---|
| 2,283,925 A | 5/1942 | Harvey |
| 2,886,529 A | 5/1959 | Louis |
| 3,574,114 A | 4/1971 | Monforte |
| 3,614,554 A | 10/1971 | Shield et al. |
| 3,983,077 A | 9/1976 | Fuller et al. |
| 4,400,683 A | 8/1983 | Eda et al. |
| 4,455,545 A | 6/1984 | Shelly |
| 4,523,170 A | 6/1985 | Huth, III |
| 4,646,038 A | 2/1987 | Wanat |
| 4,759,120 A | 7/1988 | Bernstein |
| 4,859,492 A | 8/1989 | Rogers, Jr. et al. |
| 4,880,770 A | 11/1989 | Mir et al. |
| 4,967,201 A | 10/1990 | Rich, III |
| 5,084,749 A | 1/1992 | Losee et al. |
| 5,130,675 A | 7/1992 | Sugawara |
| 5,139,999 A | 8/1992 | Gordon et al. |
| 5,154,973 A | 10/1992 | Imagawa et al. |
| 5,198,824 A | 3/1993 | Poradish |
| 5,217,754 A | 6/1993 | Santiago-Aviles et al. |
| 5,219,377 A | 6/1993 | Poradish |
| 5,263,198 A | 11/1993 | Geddes et al. |
| 5,272,485 A | 12/1993 | Mason et al. |

(Continued)

FOREIGN PATENT DOCUMENTS

| | | |
|---|---|---|
| EP | 0026056 A1 | 4/1981 |
| EP | 0939451 A1 | 1/1999 |
| EP | 1376759 A2 | 2/2004 |
| GB | 1125897 A | 9/1968 |

OTHER PUBLICATIONS

Andrenko, A.S. et al. EM Analysis of PBG Substrate Microstrip Circuits for Integrated Transmitter Front End. MMET 2000 Proceedings pp. 295-297.

(Continued)

*Primary Examiner* — Giovanna Wright
(74) *Attorney, Agent, or Firm* — Burns & Levinson LLP; David W. Gomes (57) ABSTRACT

A MAX-phase material is provided for a cutting tool and other applications.

14 Claims, 5 Drawing Sheets

(56) References Cited

U.S. PATENT DOCUMENTS

| | | |
|---|---|---|
| 5,403,797 A | 4/1995 | Ohtani et al. |
| 5,427,988 A | 6/1995 | Sengupta et al. |
| 5,456,945 A | 10/1995 | McMillan et al. |
| 5,478,610 A | 12/1995 | Desu et al. |
| 5,503,912 A | 4/1996 | Setoyama et al. |
| 5,513,382 A | 4/1996 | Agahi-Kesheh et al. |
| 5,535,445 A | 7/1996 | Gunton |
| 5,540,772 A | 7/1996 | McMillan et al. |
| 5,543,773 A | 8/1996 | Evans et al. |
| 5,584,053 A | 12/1996 | Kommrusch et al. |
| 5,590,387 A | 12/1996 | Schmidt et al. |
| 5,614,252 A | 3/1997 | McMillan et al. |
| 5,625,365 A | 4/1997 | Tom et al. |
| 5,635,433 A | 6/1997 | Sengupta |
| 5,656,561 A | 8/1997 | Rogers et al. |
| 5,707,459 A | 1/1998 | Itoyama et al. |
| 5,707,715 A | 1/1998 | deRochemont et al. |
| 5,747,870 A | 5/1998 | Pedder |
| 5,759,923 A | 6/1998 | McMillan et al. |
| 5,764,189 A | 6/1998 | Lohninger |
| 5,771,567 A | 6/1998 | Pierce et al. |
| 5,854,608 A | 12/1998 | Leisten |
| 5,859,621 A | 1/1999 | Leisten |
| 5,888,583 A | 3/1999 | McMillan et al. |
| 5,889,459 A | 3/1999 | Hattori et al. |
| 5,892,489 A | 4/1999 | Kanba et al. |
| 5,903,421 A | 5/1999 | Furutani et al. |
| 5,933,121 A | 8/1999 | Rainhart et al. |
| 5,945,963 A | 8/1999 | Leisten |
| 6,023,251 A | 2/2000 | Koo et al. |
| 6,027,826 A | 2/2000 | deRochemont et al. |
| 6,028,568 A | 2/2000 | Asakura et al. |
| 6,031,445 A | 2/2000 | Marty et al. |
| 6,040,805 A | 3/2000 | Huynh et al. |
| 6,046,707 A | 4/2000 | Gaughan et al. |
| 6,052,040 A | 4/2000 | Hino |
| 6,111,544 A | 8/2000 | Dakeya et al. |
| 6,143,432 A | 11/2000 | deRochemont et al. |
| 6,154,176 A | 11/2000 | Fathy et al. |
| 6,176,004 B1 | 1/2001 | Rainhart et al. |
| 6,181,297 B1 | 1/2001 | Leisten |
| 6,188,368 B1 | 2/2001 | Koriyama et al. |
| 6,195,049 B1 | 2/2001 | Kim et al. |
| 6,204,203 B1 | 3/2001 | Narwankar et al. |
| 6,208,843 B1 | 3/2001 | Huang et al. |
| 6,222,489 B1 | 4/2001 | Tsuru et al. |
| 6,227,188 B1 | 5/2001 | Tankala et al. |
| 6,266,020 B1 | 7/2001 | Chang |
| 6,271,803 B1 | 8/2001 | Watanabe et al. |
| 6,300,894 B1 | 10/2001 | Lynch et al. |
| 6,320,547 B1 | 11/2001 | Fathy et al. |
| 6,323,549 B1 | 11/2001 | deRochemont et al. |
| 6,492,949 B1 | 12/2002 | Breglia et al. |
| 6,496,149 B1 | 12/2002 | Birnbaum et al. |
| 6,501,415 B1 | 12/2002 | Viana et al. |
| 6,541,820 B1 | 4/2003 | Bol |
| 6,552,693 B1 | 4/2003 | Leisten |
| 6,559,735 B1 | 5/2003 | Hoang et al. |
| 6,583,699 B2 | 6/2003 | Yokoyama |
| 6,605,151 B1 | 8/2003 | Wessels et al. |
| 6,611,419 B1 | 8/2003 | Chakravorty |
| 6,620,750 B2 | 9/2003 | Kim et al. |
| 6,639,556 B2 | 10/2003 | Baba |
| 6,642,908 B2 | 11/2003 | Pleva et al. |
| 6,650,303 B2 | 11/2003 | Yoon et al. |
| 6,670,497 B2 | 12/2003 | Tashino et al. |
| 6,680,700 B2 | 1/2004 | Hilgers |
| 6,683,576 B2 | 1/2004 | Achim |
| 6,686,406 B2 | 2/2004 | Tomomatsu et al. |
| 6,690,336 B1 | 2/2004 | Leisten et al. |
| 6,697,605 B1 | 2/2004 | Atokawa et al. |
| 6,742,249 B2 | 6/2004 | deRochemont et al. |
| 6,742,611 B1 | 6/2004 | Illerhaus et al. |
| 6,743,744 B1 | 6/2004 | Kim et al. |
| 6,762,237 B2 | 7/2004 | Glatkowski et al. |
| 6,791,496 B1 | 9/2004 | Killen et al. |
| 6,864,848 B2 | 3/2005 | Sievenpiper |
| 6,906,674 B2 | 6/2005 | McKinzie, III et al. |
| 6,919,119 B2 | 7/2005 | Kalkan et al. |
| 7,047,637 B2 | 5/2006 | deRochemont et al. |
| 7,405,698 B2 | 7/2008 | deRochemont |
| 7,564,887 B2 | 7/2009 | Wang et al. |
| 7,572,313 B2 * | 8/2009 | Palanisamy et al. ............ 75/241 |
| 7,763,917 B2 | 7/2010 | deRochemont |
| 7,892,659 B2 * | 2/2011 | Oboodi et al. ................. 428/696 |
| 7,917,311 B2 * | 3/2011 | Finkel et al. .................... 702/39 |
| 8,069,935 B1 * | 12/2011 | Miess et al. ................... 175/374 |
| 2001/0023779 A1 | 9/2001 | Sugaya et al. |
| 2001/0027119 A1 | 10/2001 | Furutani et al. |
| 2001/0048969 A1 | 12/2001 | Constantino et al. |
| 2002/0039667 A1 | 4/2002 | Takaya et al. |
| 2002/0047768 A1 | 4/2002 | Duffy |
| 2002/0070983 A1 | 6/2002 | Kozub et al. |
| 2002/0092472 A1 | 7/2002 | Hayashi et al. |
| 2002/0110004 A1 | 8/2002 | Parks |
| 2002/0190818 A1 | 12/2002 | Endou et al. |
| 2003/0002045 A1 | 1/2003 | Nemat-Nasser et al. |
| 2003/0034124 A1 | 2/2003 | Sugaya et al. |
| 2003/0073565 A1 | 4/2003 | Ellis et al. |
| 2003/0080325 A1 | 5/2003 | Uchiyama et al. |
| 2003/0107455 A1 | 6/2003 | Imanaka et al. |
| 2003/0111714 A1 | 6/2003 | Bates et al. |
| 2003/0122647 A1 | 7/2003 | Ou |
| 2003/0148024 A1 | 8/2003 | Kodas et al. |
| 2003/0161959 A1 | 8/2003 | Kodas et al. |
| 2003/0170436 A1 | 9/2003 | Sumi et al. |
| 2003/0186636 A1 * | 10/2003 | Akyuz et al. .................. 451/541 |
| 2003/0221621 A1 | 12/2003 | Pokharna et al. |
| 2004/0000964 A1 | 1/2004 | Killen et al. |
| 2004/0000966 A1 | 1/2004 | Killen et al. |
| 2004/0000970 A1 | 1/2004 | Killen et al. |
| 2004/0000972 A1 | 1/2004 | Killen et al. |
| 2004/0000975 A1 | 1/2004 | Killen et al. |
| 2004/0000976 A1 | 1/2004 | Killen et al. |
| 2004/0001024 A1 | 1/2004 | Killen et al. |
| 2004/0001026 A1 | 1/2004 | Killen et al. |
| 2004/0001027 A1 | 1/2004 | Killen et al. |
| 2004/0001028 A1 | 1/2004 | Killen et al. |
| 2004/0012081 A1 | 1/2004 | Kwon |
| 2004/0033654 A1 | 2/2004 | Yamagata |
| 2004/0070915 A1 | 4/2004 | Nagai et al. |
| 2004/0084080 A1 | 5/2004 | Sager et al. |
| 2004/0092236 A1 | 5/2004 | Irie et al. |
| 2004/0113738 A1 | 6/2004 | Ahn et al. |
| 2004/0118448 A1 | 6/2004 | Scher et al. |
| 2004/0189528 A1 | 9/2004 | Killen et al. |
| 2005/0036269 A1 | 2/2005 | Ma et al. |
| 2005/0051870 A1 | 3/2005 | Yamazaki et al. |
| 2006/0086994 A1 | 4/2006 | Viefers et al. |
| 2006/0092079 A1 | 5/2006 | deRochemont |
| 2006/0093860 A1 * | 5/2006 | Schuisky et al. .............. 428/698 |
| 2006/0125681 A1 | 6/2006 | Smith et al. |
| 2006/0134491 A1 | 6/2006 | Hilchenko et al. |
| 2007/0003781 A1 | 1/2007 | deRochemont |
| 2007/0137257 A1 | 6/2007 | Desantolo et al. |
| 2007/0139976 A1 | 6/2007 | deRochemont |
| 2007/0166453 A1 | 7/2007 | Van Duren et al. |
| 2007/0170535 A1 | 7/2007 | deRochemont |
| 2007/0259768 A1 | 11/2007 | Kear et al. |
| 2008/0136395 A1 | 6/2008 | Bennett |
| 2009/0004370 A1 | 1/2009 | Zurcher et al. |
| 2009/0011922 A1 | 1/2009 | deRochemont |
| 2009/0015314 A1 | 1/2009 | Kirchmeier et al. |
| 2010/0055492 A1 * | 3/2010 | Barsoum et al. ............... 428/613 |
| 2011/0021007 A1 | 1/2011 | deRochemont |
| 2011/0049394 A1 | 3/2011 | deRochemont |
| 2011/0065224 A1 | 3/2011 | Bollman et al. |

OTHER PUBLICATIONS

Bardi, I. et al. Plane Wave Scattering From Frequency-Selective Surfaces by the Finite-Element Method. IEEE Transactions on Magnetics 38(2) Mar. 2002. pp. 641-644.

(56) References Cited

OTHER PUBLICATIONS

Chappell, W. et al. Composite Metamaterial Systems for Two-Dimensional Periodic Structures. © 2002 IEEE pp. 384-387.

Cheng, Y.L. et al. Preparation and Characterization of (Ba.Sr)TiO3 thin films using interdigital electrodes. Microelectronic Engineering vol. 66 (2003) 872-879.

Clavijo, S. et al. Design Methodology for Sievenpiper High-Impedance Surfaces: An Artificial Magnetic Conductor for Positive Gain Electrically Small Antennas. IEEE Transactions on Antennas and Propagation 51(10). Oct. 2003. pp. 2678-2690.

Diaz, R. et al. Magnetic Loading of Artificial Magnetic Conductors for Bandwidth Enhancement. © 2003 IEEE pp. 431-434.

Hansen, R.C. Effects of a High-Impedance Screen on a Dipole Antenna. IEEE Antennas and Wireless Propagation Letters vol. 1 2002 pp. 46-49.

Joshi, P.C. et al. Processing and Characterization of Pure and Doped Ba0.6Sr0.4TiO3 thin films for tunable microwave applications. Mat. Res. Soc. Symp. Proc. vol. 656E (2001) DD4.9.1-DD4.9.6.

Kern, D.J. et al. Active Negative Impedance Loaded EBG Structures for the Realization of Ultra-Wideband Artificial Magnetic Conductors. © 2003 IEEE pp. 427-430.

Kern, D.J. et al. The Synthesis of Metamaterial Ferrites for RF Applications Using Electromagnetic Bandgap Structures. © 2003 IEEE pp. 497-500.

Kern, D.J. et al. Ultra-thin Electromagnetic Bandgap Absorbers Synthesized via Genetic Algorithms. © 2003 IEEE pp. 1119-1122.

Khun, R. et al., Characterization of Novel Mono- and Bifacially Active Semi-Transparent Crystalline Silicon Solar Cells, IEEE Transactions on Electron Devices, 46(10), Oct. 1999, p. 2013-2017.

Kretly, L.C. et al. The Influence of the Height Variation on the Frequency Bandgap in an AMC Artificial Magnetic Conductor for Wireless Applications: an EM Experimental Design Approach. Proceedings SBMO/IEEE MTT-S IMOC 2003 pp. 219-223.

Lee, Y. et al. Investigation of Electromagnetic Bandgap (EBG) Structures for Antenna Pattern Control. © 2003 IEEE, pp. 1115-1118.

McKinzie III, W.E. et al. Mitigation of Multipath Through the Use of an Artificial Magnetic Conductor for Precision CPS Surveying Antennas. © 2002 IEEE pp. 640-643.

McKinzie, W. et al. A Multi-Band Artificial Magnetic Conductor Comprised of Multiple FSS Layers. © 2003 IEEE pp. 423-426.

Monorchio, A. et al. Synthesis of Artificial Magnetic Conductors by Using Multilayered Frequency Selective Surfaces. IEEE Antennas and Wireless Propagation Letters vol. 1 2002 pp. 196-199.

Mosallaei, H. et al. Periodic Bandgap and Effective Dielectric Materials in Electromagnetics: Characterization and Applications in Nanocavities and Waveguides. IEEE Transactions on Antennas and Propagation 51(3). Mar. 2003. pp. 549-563.

Pontes, F.M. et al. Study of the dielectric and ferroelectric properties of chemically processed BaxSr1-xTiO3 thin films. Thin Solid Films, vol. 386, No. 1 (2001) 91-98.

Rogers, S. et al. AMCs Comprised of Interdigital Capacitor FSS Layers Enable Lower Cost Applications. © 2003 IEEE pp. 411-414.

Rogers, S. et al. An AMC-Based 802.11a/b Antenna for Laptop Computers. © 2003 IEEE pp. 10-13.

Sievenpiper, D.F. et al. Two-Dimensional Beam Steering Using an Electrically Tunable Impedance Surface. IEEE Transactions on Antennas and Propagation 51(10). Oct. 2003. pp. 2713-2722.

Sun, J. et al. Efficiency of Various Photonic Bandgap (PBG) Structures. $3^{rd}$ Int'l. Conf. on Microwave and Millimeter Wave Technology Proceedings 2002. pp. 1055-1058.

Tsunemine, Y. et al. Pt/BaxSr(1-x)TiO3/Pt Capacitor Technology for 0.15 micron Embedded Dynamic Random Access Memory. Jap. J. Appl. Phys. vol. 43 No. 5A (2004) 2457-2461.

Vest, R.W. Metallo-organic decomposition (MOD) processing of ferroelectric and electro-optic films: A review. Ferroelectrics, 102:1, 53-68.

Viviani, M. et al. Positive Temperature Coefficient of Electrical Resistivity below 150k of Barium Strontium Titanate. J. Amer. Ceram. Soc. vol. 87 (2004) 756-758.

Weily, A.R. et al. Antennas Based on 2-D and 3-D Electromagnetic Bandgap Materials. © 2003 IEEE pp. 847-850.

Yang, H-Y. D. et al. Surface Waves of Printed Antennas on Planar Artificial Periodic Dielectric Structures. IEEE Transactions on Antennas and Propagation 49(3). Mar. 2001. pp. 444-450.

Zhang, Y. et al. Planar Artificial Magnetic Conductors and Patch Antennas. IEEE Transactions on Antennas and Propagation 51(10). Oct. 2003. pp. 2704-2712.

Ziroff, A. et al. A Novel Approach for LTCC Packaging Using a PBG Structure for Shielding and Package Mode Suppression. $33^{rd}$ European Microwave Conference—Munich 2003 pp. 419-422.

International Search Report and Written Opinion dated Mar. 29, 2012 for PCT/US11/61315.

* cited by examiner

CHEMICALLY COMPLEX ABLATIVE MAX-PHASE MATERIAL AND METHOD OF MANUFACTURE

CROSS REFERENCE TO RELATED APPLICATIONS

This application claims priority from U.S. Provisional Patent Application Ser. No. 61/363,813, filed Jul. 13, 2010 and incorporated herein by reference in its entirety.

FIELD OF THE INVENTION

The present invention generally relates to cutting tools, and in particular to drill bits used for drilling through geological formations.

BACKGROUND OF THE INVENTION

Drilling or cutting tools are prone to failure when cutting into very hard material compressed to high pressures and/or heated to high temperatures or when used in corrosive environments, such as those found in deep well oil drilling environments. Conventional cutting tools are comprised of a metal amalgam applied to a hard metal bit head, most often a titanium bit head. The metal amalgam is impregnated with diamond shards, which are the tool's actual cutting elements. A principal failure mode is caused by the temperature differential generated between the amalgam's cutting surface and the bit head to which it is attached. Friction induced by cutting into hard material, cutting into highly pressurized materials, or cutting into hot materials will frequently generate sufficient heat differentials between the cutting surface and the bit head to crack the tool. These conditions are quite often present when drilling for fossil fuels at greater depths. In these instances, mechanical failures have high carrying costs due to longer periods lost time encumbered in replacing the drill bit.

In view of the above discussion, it would be beneficial to have a cutting tool that is less prone to failure when cutting through hard materials, highly pressurized materials, or materials heated to elevated temperatures.

DEFINITION OF TERMS

The term "amorphous material" is herein understood to mean a material that does not comprise a periodic lattice of atomic elements, or lacks mid-range (over distances of 10's of nanometers) to long-range crystalline order (over distances of 100's of nanometers).

The terms "chemical complexity", "compositional complexity", "chemically complex", or "compositionally complex" are herein understood to refer to a material, such as a metal or superalloy, compound semiconductor, or ceramic that consists of three (3) or more elements from the periodic table.

The term "LCD" is herein understood to mean a method that uses liquid precursor solutions to fabricate materials of arbitrary compositional or chemical complexity as an amorphous laminate or free-standing body or as a crystalline laminate or free-standing body that has atomic-scale chemical uniformity and a microstructure that is controllable down to nanoscale dimensions.

The term "liquid precursor solution" is herein understood to mean a solution of hydrocarbon molecules that also contains soluble metalorganic compounds that may or may not be organic acid salts of the hydrocarbon molecules into which they are dissolved.

The term "MAX phase material" is herein understood to define a chemically complex intermetallic ceramic material having the general chemical formula $M_{(n+1)}AX_n$, wherein M is first row transition-metal element, A is an "A-group" element found in columns III-VI of the periodic table, and X is either carbon (C) or nitrogen (N).

The term "microstructure" is herein understood to define the elemental composition and physical size of crystalline grains forming a material substance.

The term "nanoscale" is herein understood to define physical dimensions measured in lengths ranging from 1 nanometer (nm) to 100's of nanometers (nm).

The term "solid solution" is herein understood to be an amorphous material.

In view of the above discussion, it would be beneficial to improve the useful life of cutting tools and operational efficiency of drilling systems, particularly those systems deployed in extreme or harsh environments. The present invention instructs methods to fabricate a cutting tool that has a surface consisting of diamond shards (teeth) embedded within a mechanically strong, corrosion-resistant, thermal shock-resistant laminate.

SUMMARY OF THE INVENTION

One embodiment of the present invention provides a cutting tool, comprising: a support substrate; and a complex ceramic cutting surface laminate formed on the support substrate and including hard shards, a first row transition-metal element, an element from columns III-VI of the periodic table and carbon and/or nitrogen.

The laminate may include an $M_{(n+1)}AX_n$ (MAX) phase material; where M is the first row transition-metal element, where A is an element from columns III-VI of the periodic table and where X is carbon and/or nitrogen. The MAX-phase material may have micro-Vickers hardness greater than 1 GPa. The MAX-phase material may have micro-Vickers hardness greater than 4 GPa. The MAX-phase material may further include particles embedded within it that include carbide, carbon fiber, coated-carbon fiber, and/or nitride particles. The hard shards may have hardness in the range of 8-10.

The laminate may have a polycrystalline structure or fully crystalline structure except for the hard shards. The hard shards may comprise diamond. The substrate may be a drill bit. The laminate may be formed on the substrate by liquid chemical deposition of a colloidal solution of nanoparticles in dissolved metal-organic precursors.

Another embodiment of the present invention provides a MAX-phase material, comprising $M_{(n+1)}AX_n$ (MAX) phase material; where M is the first row transition-metal element, where A is an element from columns III-VI of the periodic table and where X is carbon and nitrogen.

The material may have atomic scale crystalline uniformity. The material may further comprise hard material shards and/or carbon fibers, coated carbon fibers, or carbon, carbide or nitride nanoparticles. The laminate may be formed by liquid chemical deposition of a colloidal solution of nanoparticles in dissolved metal-organic precursors Yet another embodiment of the present invention provides a method of forming a MAX-phase material, comprising the steps of: forming a stoichiometric colloidal suspension of metal-organic precursors in solution along with carbon, carbide and/or nitride nanoparticles; spraying the colloidal suspension onto a heated substrate to deposit the suspension and to simultaneously decompose the precursors and leave an amorphous ceramic material with embedded carbon, carbide, and/or nitride nanoparticles on the substrate; and rapid plasma annealing the amorphous ceramic material to create crystalline structure with carbon and/or nitrogen integrated from the carbon, carbide, and/or nitride nanoparticles.

The method may further comprise the step of repeating the steps of spraying and rapid plasma annealing to form a MAX-phase material having multiple layers. The method may still further comprise the step of repeating the step of forming to create different compositional mixtures in two or more of the multiple layers.

The colloidal suspension may include a super-stoichiometric relationship of the carbon, carbide and/or nitride nanoparticles to A-group elements for the MAX-phase material. The colloidal suspension may have a stoichiometry that produces a crystalline structure with a super stoichiometry of X group elements to A group elements. The colloidal suspension may have a super stoichiometry of X group elements of 1.1× to 3× to A group elements The colloidal suspension may also include hard material shards, carbon or carbide nanoparticles, carbon fibers, coated carbon fibers, and/or nitride nanoparticles. The shards may be diamond.

In still another embodiment, the present invention provides a cutting tool that minimizes crack-forming differentials by embedding secondary phase materials, preferably diamond shards and X-group nanoparticles to form an ablative ceramic adhered to the bit head.

In still a further embodiment, the present invention provides means to fabricate chemically complex MAX phase materials on the surface of another material, or as a free-standing body.

BRIEF DESCRIPTION OF THE DRAWINGS

The present invention is illustratively shown and described in reference to the accompanying drawings, in which.

DETAILED DESCRIPTION OF THE EMBODIMENT

The present invention is introduced using examples and particular embodiments for descriptive purposes. Although a variety of examples are presented to show how various configurations can be employed to achieve the desired improvements, these particular embodiments are only illustrative and not intended in any way to restrict the inventions presented.

The current application incorporates by reference all matter contained in de Rochemont and Kovacs, U.S. Ser. No. 12/843,112 filed Jul. 26, 2010, "LIQUID CHEMICAL DEPOSITION PROCESS APPARATUS AND EMBODIMENTS", (de Rochemont et al. '112), and de Rochemont and Farmer U.S. Pat. No. 5,707,715, entitled "METAL CERAMIC COMPOSITES WITH IMPROVED INTERFACIAL PROPERTIES AND METHODS TO MAKE SUCH COMPOSITES", filed Aug. 29, 1996, issued Jan. 13, 1998 (de Rochemont et al. '715), and de Rochemont and Farmer, U.S. Pat. No. 6,143,432, entitled "CERAMIC COMPOSITES WITH IMPROVED INTERFACIAL PROPERTIES AND METHODS TO MAKE SUCH COMPOSITES", filed Jan. 9, 1998, issued Nov. 7, 2000 (de Rochemont et al. '432).

Cutting tools generally locate shards of a very hard material, such as diamond, on the cutting surface of a bit head. The bit head is usually a mechanically hard substance, such as titanium, and is used to mechanically support the cutting surface. The hard material shards are located on the bit head cutting surface by impregnating them into a metal amalgam that is bonded to the bit head. The cutting process scrapes the hardened shards over the material to be cut. Repetitively scraping the surface with the hardened shards digs into and tears away the material through the application of frictional forces. Principal failure modes include the corrosive erosion of the metal amalgam and heat differentials generated between the bit head and the cutting surface that produce shear forces strong enough to crack the amalgam and/or the bit head itself. Shear forces are created when the heat differential causes unbalanced thermal expansion within the cutting tool that is greater than its tensile strength.

Figure 1:
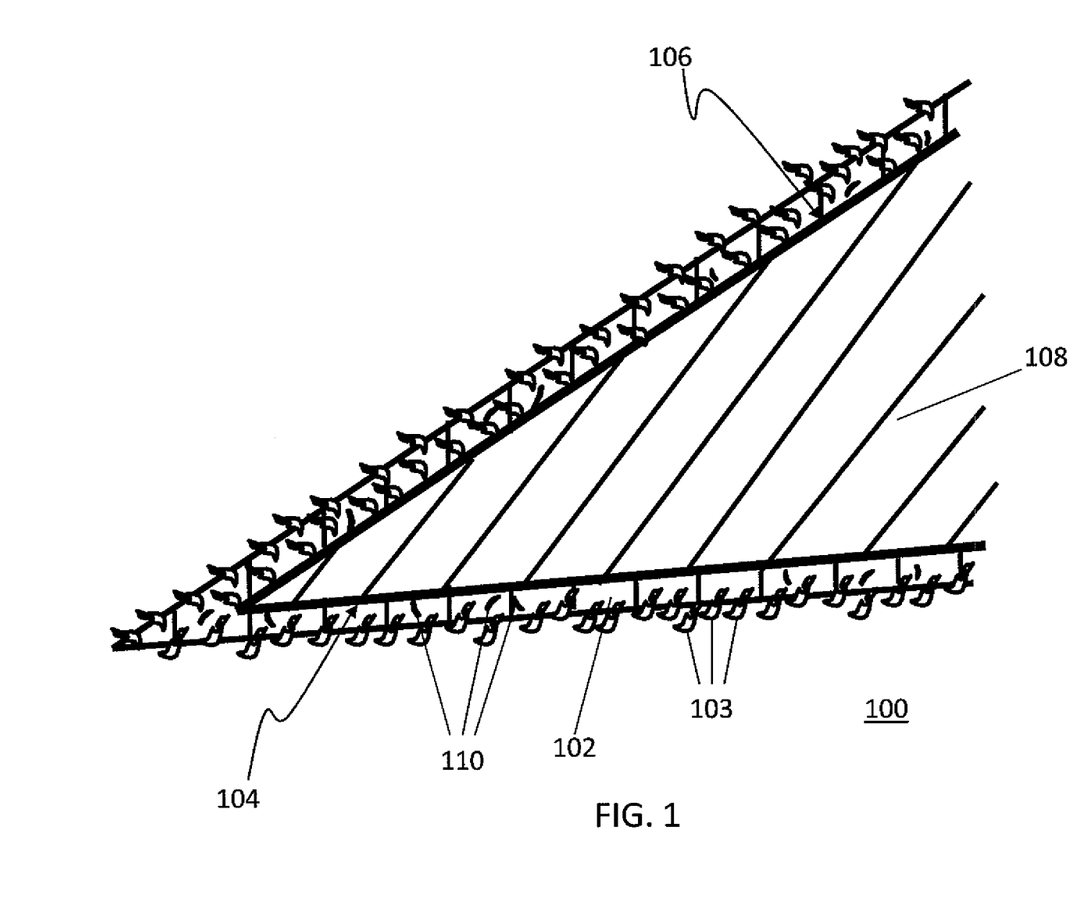
FIG. 1 shows a cross-sectional depiction of a cutting tool constructed in accordance with one embodiment of the invention.
Figure 2A:
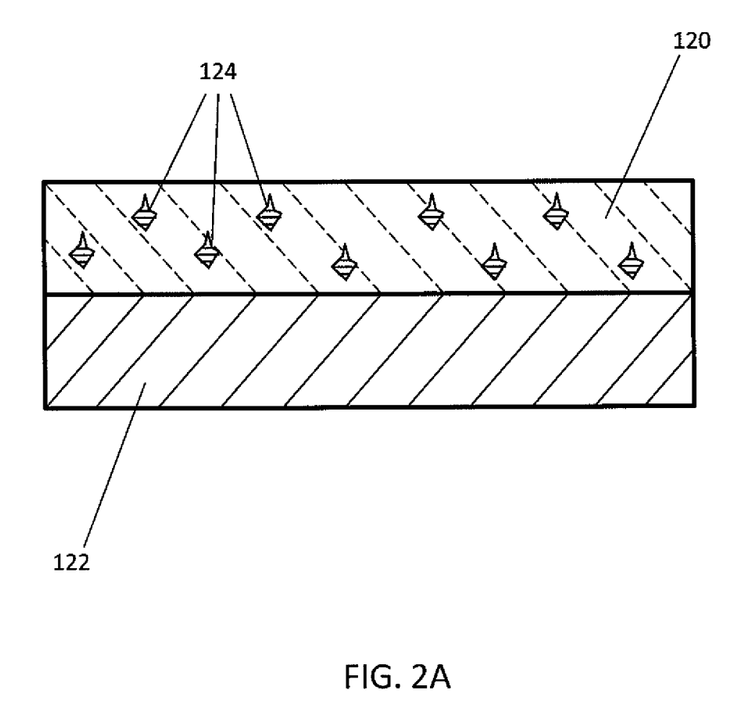
FIGS. 2A through 2C are sectional views of material constructed in accordance with one or more embodiments of the present invention.
Figure 2B:
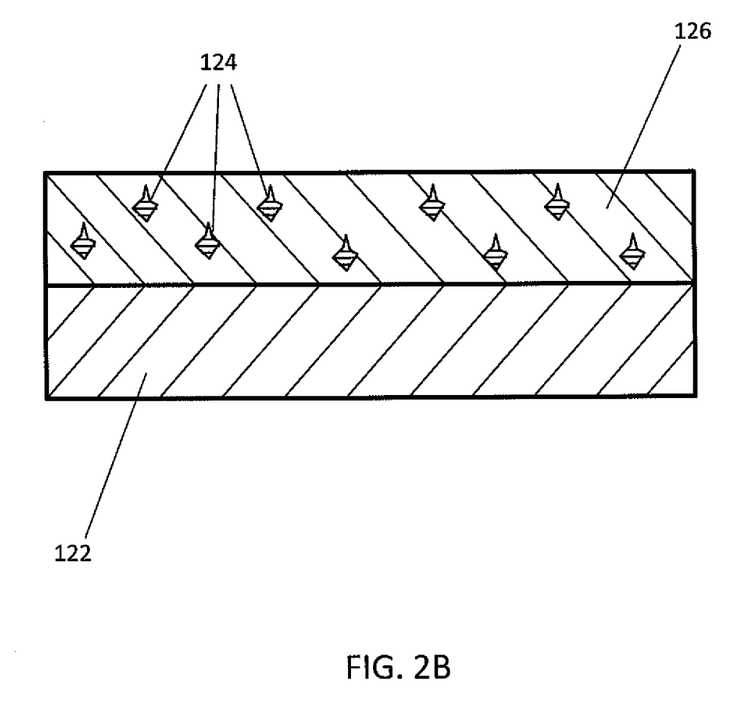
Figure 2C:
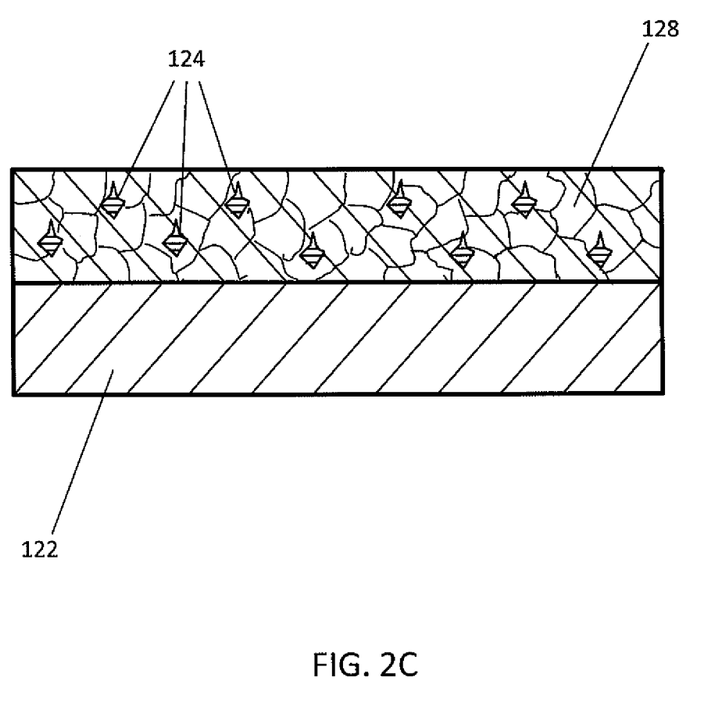

As shown in FIG. 1, a preferred embodiment of the invention uses the liquid chemical deposition (LCD) process to produce a cutting tool 100 that consists of a MAX-phase ceramic laminate 102 impregnated with shards of a very hard material 103, preferably materials such as diamond that have hardness values in the range of 8-10, on the cutting surfaces 104,106 of a bit head 108. The bit head 108 may be any material, but preferably is a hard, shape-formable material, such as titanium. MAX-phase ceramics are mechanically hard, oxidation/corrosion-resistant, damage tolerant materials that have excellent high-temperature properties, and will typically exhibit micro-Vickers hardness in the range of 1 GPa 4 GPa at elevated temperatures up to 700° C. This combination of physical and chemical properties makes MAX-phase materials ideal for use in harsh environments, such as those found in deep well oil exploration, when formed as a laminate on a cutting surface. The MAX-phase ceramic laminate may optionally have additional elements 110 embedded within it to improve its ablative properties. Ablative ceramics are characterized by their ability to prevent the creation of strong thermal gradients (heat differentials) sufficient to crack the cutting tool by allowing tiny particles with high heat capacities to carry thermal energy from the laminate body as they are dislodged from its surface. Rather, heat generated by frictional forces on the surface of the ceramic is dissipated through surface particles ablated off of the heated surface. While ablative ceramics will wear, as the metal amalgams do, they can withstand significantly higher temperatures found in harsh environments. Additional elements 110 may consist of carbon-fibers, coated carbon fibers, or aluminum nitride particles or nanoscale particles consisting either of carbon or aluminum nitride.

MAX-phase ceramics are impervious to many corrosive elements found in deep oil drilling environments, such as carbon dioxide and hydrogen sulfide gas. Previous fabrication techniques for MAX-phase ceramics consist of sintered powder preparations containing stoichiometric proportions of the desired elemental chemistry. Better results are achieved when the powder preparations are sintered using pulsed plasma discharges. The powder preparations are only used to make free-standing bodies, which are either machined or slip-cast to form a desired geometric shape. While it is possible to embed secondary phase components in powder-prepared MAX-phase materials, they cannot be applied to the surface of a pre-existing body as a laminate. Chemical vapor deposition (CVD) techniques have been used to form MAX-phase laminates on the surface, but vapor delivery systems preclude the integration of shards of very hard material 103 needed to form a cutting surface, or the integration of additional elements 110 in the laminate to improve the cutting surface's ablative properties.

Reference is now made to FIGS. 2A, 2B, 2C & 3 to illustrate embodiments of the invention that relate to the synthesis of MAX-phase materials by LCD processes, and the integration of shards of very hard material 103 and additional elements 110 within the formed body. As detailed in de Rochemont et al. '112, the LCD process forms a compositionally complex laminate 120 having atomic-scale chemical uniformity from a liquid precursor solution that is sprayed on a substrate 122 heated to 250-450° C. Atomic-scale chemical uniformity is endowed to the laminate through the molecular-level subdivision of the metalorganic precursors that are achieved in solution, and their simultaneous decomposition on the substrate surface. The laminate initially forms an amorphous solid due to the low deposition temperatures (250-450° C.). The LCD laminate will form an elemental solid solution if it is deposited in reducing or oxygen-free atmospheres, i.e., consisting of a chemically inert gas, hydrogen, or an oxidizing partial pressure ratio of carbon dioxide/carbon monoxide. Similarly, the LCD laminate will form a metal oxide solid solution when it is formed in oxidizing atmospheres. As detailed in de Rochemont et al. '715 and '432, secondary phase materials 124, which may comprise shards of very hard material 103 and additional elements 110, are embedded into the compositionally complex laminate 120 by forming a colloidal suspension that uniformly mixes the secondary phase materials 124 with the liquid precursor solution immediately prior to the spray deposition step. The amorphous deposit is rendered into a fully crystallized laminate 126 or poly-crystalline laminate 128 having uniform microstructure controllable down to nanoscale levels, by plasma annealing steps applied intermittently with the liquid precursor sprays. LCD allows a free-standing body that is amorphous, fully crystalline, or polycrystalline by optionally removing substrate 122 once the compositionally complex laminate(s) 120, 126, 128 have been formed to a thickness(es) that is (are) sufficient to mechanically support its (their) own weight. The surface adhesion of an LCD laminate to the substrate 122 is stronger than the tensile strength of most ceramics. The low deposition temperatures (250° C. to 450° C.) are insufficient to anneal any tempering applied to the bit head 108, thereby allowing cutting tool 100 to have higher intrinsic mechanical strength and not otherwise interfere with any prior heat treatments or tempering of the bit head 108.

As noted above, MAX-phase materials are attractive for use a laminate in these applications because they are elastically stiff, resistant to chemical and thermal shock, damage tolerant, have relatively low coefficients of thermal expansion, and have high corrosion resistance. The most basic form of MAX-phase materials are binary carbides or nitrides and maintain the following compositional relationship:

$$M_{(n+1)}AX_n \tag{1}$$

where M is selected from the following transition-metal elements:

M=Sc, Ti, V, Cr, Mn, Fe, Ni, Cu, Zn where A is selected from the following "A-group" elements:

A=Al, Si, Ga, Ge, In, Sn, Sb where X is either nitrogen (N) or carbon (C), and, n=1, 2, or 3.

LCD enables the fabrication of higher order MAX-phase materials that have wider ranging or tailor-made physical, chemical, or electro-chemical properties. Higher order MAX-phase materials maintain higher complexity compositional relationships, for instance:

$$M^{(I)}{}_{(a)}M^{(II)}{}_{(b)}M^{(III)}{}_{(c)}M^{(IV)}{}_{(d)}A^{(I)}{}_{(1-x-y-z)}A^{(II)}{}_{(x)}A^{(III)}{}_{(y)}A^{(IV)}{}_{(z)}X_n \tag{2}$$

where the molar fractions $a+b+c+d=(n+1)$, $x+y+z \leq 1$, with, $M^{(X)}$ elements (X=I, II, III, IV) selected from the group of M elements listed above, $A^{(Y)}$ elements (Y=I, II, III, IV) selected from the A-group elements listed above, where X is nitrogen (N), carbon (C), or a mixture of nitrogen and carbon, and n=1, 2, or 3

It is often necessary to specifically optimize the physical, chemical, or electro-chemical properties of a material for specific applications. Physical property optimization enabled by the inclusion or substitution of a plurality of transition-metal or A-group elements would include (micro) Vicker's hardness, Young's modulus, tensile strength, coefficient of thermal expansion, sound velocity, electrical and thermal conductivity. For instance, substituting transition-metal elements that form strong bonds with A-group elements will improve the finished MAX-phase material's hardness. However, a plurality of substitutions and additions are generally required to achieve specific optimization of one property without comprising the integrity of another desirable physical, chemical or electro-chemical property. Partial substitution of a nitride element for a carbide would be made to improve or alter thermal conductivity.

Figure 3:
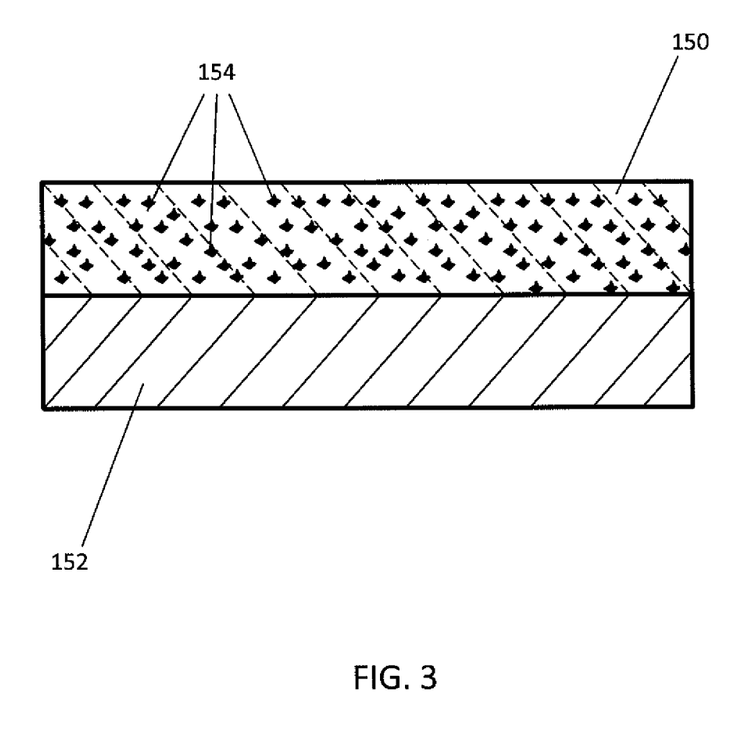
FIG. 3 is a sectional view of material constructed in accordance with another embodiment of the present invention.

The MAX-phase material is formed by first depositing an amorphous elemental pre-form material 150 on a substrate 152 heated to 250-450° C. using LCD processes, preferably in a reducing gas environment as noted above. The liquid precursor solution is prepared to endow the amorphous pre-form material 150 with the desired stoichiometric relationship between transition-metal elements (M group) and group-A elements. X-group nanoparticles 154 are incorporated into the amorphous elemental pre-form material 150 by forming a colloidal suspension in the liquid precursor solution prior to the spray deposition. Carbon nanoparticles, or nanoparticles comprising one or more desirable A-group elements with carbon, for instance, silicon carbide, aluminum carbide, are embedded into the amorphous element pre-form material 150 as X-group nanoparticles 154 when it is desirable to form a MAX-phase material consisting of carbide material, i.e., X=C. Nitride nanoparticles, comprising one or more desirable A-group elements, for instance, aluminum nitride (AlN), or gallium nitride (GaN), are embedded into the amorphous pre-form material 150 as X-group nanoparticles 154 when it is desirable to form a MAX-phase material consisting of nitride material, i.e., X=N. A combination of carbide and nitride nanoparticles are embedded into the amorphous perform material 150 as x-group nanoparticles 154 when it is desirable to form a MAX-phase material consisting of carbide and nitride material, i.e., X=C and N. The X-group nanoparticles 154 are the elemental source for the X-group element in the stoichiometry equations (1) and (2). It is preferred that the total weight of X-group nanoparticles 154 have a super-stoichiometric relationship to the group-A elements, such that the total weight of X-group nanoparticles 154 incorporated into the amorphous elemental pre-form material 150 comprise 1.1×-3× the total number of moles A-group elements incorporated therein after spray deposition. A bake-out step that heats the amorphous elemental pre-form material to temperatures in the range of 450° C.-600° C. is used to remove any undecomposed residual metalorganic precursor material from the amorphous elemental pre-form material 150 prior to subsequent processing steps.

The X-group nanoparticles 154 are then reacted with the amorphous elemental pre-form material 150 by plasma annealing the deposit for 5-60 seconds at RF powers in the range of 10-300 W in gas mixtures that may contain argon, helium, and/or xenon at atmospheric pressures ranging between 1.5 to 5 Torr (1500 to 5000 mTorr), with partial pressures of carbon dioxide and carbon monoxide to prevent the evolution of carbon by-products from the laminate during processing. Nitrogen may be added to the ionized plasma when in it is desirable to use nitrogen (N) and an elemental component (X material) in the finished deposit. The substrate 152 is heated to a temperature in the range of 50° C. to 500° C. prior to initiating the plasma annealing steps. Shorter plasma annealing times, in the range of 5 seconds to 30 seconds, are used to form polycrystalline 128 laminates. Longer plasma annealing times, in the range of 30 seconds to 60 seconds, are used to form fully crystalline laminates 126, except for hard material 103. Any excess X-group nanoparticles 154 remaining in the laminate may be used as an additional element 110 that improves the ablative properties of the formed MAX-phase material. Additional elements 110 may also comprise carbon fiber, coated-carbon fiber, aluminum nitride particles, and very hard material 103, comprising diamond shards or dust, are introduced into the amorphous pre-form material 150 as a colloidal suspension in the liquid precursor solution immediately prior to the deposition step. Greater thicknesses, including thicknesses sufficient to support the weight of the laminate as a free-standing body when the substrate 152 is optionally removed, are achieved by repeating the spray deposition, bake-out, and annealing steps a plurality of times. Additional, multi-layer MAX-phase material structures may formed with varied composition in different layers by sequentially depositing and plasma annealing a plurality of different MAX-phase compositions The present invention is illustratively described above in reference to the disclosed embodiments. Various modifications and changes may be made to the disclosed embodiments by persons skilled in the art without departing from the scope of the present invention. For example, various sizes of diamond shards may be used including diamond dust. The process is also applicable to various types of cutting tools.

What is claimed is:

1. An ablative MAX-phase material having atomic-scale chemical uniformity, comprising $M_{(n-1)}AX_n$ (MAX) phase material, where M is the first row transition-metal element, where A is an element from columns III-VI of the periodic table and where X is carbon and/or nitrogen, wherein the material is a crystalline structure with uniformly mixed X-group nanoparticles as an excess secondary phase material formed using a super stoichiometry of X-group precursor materials.

2. The material of claim 1, further comprising hard material shards or carbon fibers or coated-carbon fibers as a secondary phase material or secondary phase materials.

3. The material of claim 2, wherein the hard material shards are diamond.

4. The material of claim 1, wherein the material is formed by liquid chemical deposition of a colloidal suspension of nanoparticles in dissolved metal-organic precursors.

5. The ablative MAX-phase material of claim 1, wherein the material having atomic-scale chemical uniformity is chemically complex comprising more than 3 elements from the periodic table.

6. The chemically complex ablative material of claim 5, wherein the M compositional element comprises two (2) or more elements from the selection:

M=Sc, Ti, V, Cr, Mn, Fe, Ni, Cu, Zn.

7. The chemically complex ablative material of claim 5, wherein the A compositional element comprises two (2) or more elements from the selection:

A=Al, Si, Ga, Ge, In, Sn, Sb.

8. The ablative MAX-phase material of claim 1, wherein the ablative material forms a free-standing body.

9. The ablative MAX-phase material of claim 1, where in the ablative material is in the form of a laminate.

10. The laminate of claim 9, wherein the ablative MAX-phase material is formed on a substrate comprising titanium.

11. The ablative MAX-phase material of claim 1, wherein the super stoichiometry of X-group precursor elements is 1.1× to 3× the A-group precursor elements.

12. The ablative MAX-phase material of claim 1, wherein the MAX-phase material has micro-Vickers hardness greater than 1 GPa.

13. The ablative MAX-phase material of claim 1, wherein the MAX-phase material has micro-Vickers hardness greater than 4 GPa.

14. The ablative MAX-phase material of claim 1, wherein the MAX-phase material has a polycrystalline or fully crystalline structure except for the excess secondary phase material.

* * * * *